(12) United States Patent
Hart

(10) Patent No.: US 12,348,351 B2
(45) Date of Patent: Jul. 1, 2025

(54) PPDU FORMAT SUPPORTING VENDOR SPECIFIC PER-USER PARAMETERS

(71) Applicant: Cisco Technology, Inc., San Jose, CA (US)

(72) Inventor: Brian D. Hart, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 13 days.

(21) Appl. No.: 18/540,692

(22) Filed: Dec. 14, 2023

(65) Prior Publication Data

US 2025/0016039 A1    Jan. 9, 2025

Related U.S. Application Data

(60) Provisional application No. 63/512,550, filed on Jul. 7, 2023.

(51) Int. Cl.
*H04L 27/26*    (2006.01)
*H04L 5/00*    (2006.01)

(52) U.S. Cl.
CPC ........ *H04L 27/2692* (2013.01); *H04L 5/0007* (2013.01); *H04L 27/2602* (2013.01)

(58) Field of Classification Search
CPC ............. H04L 27/2692; H04L 27/2603; H04L 27/2602; H04L 5/0007; H04L 27/2694
See application file for complete search history.

(56) References Cited

U.S. PATENT DOCUMENTS

| | | | | |
|---|---|---|---|---|
| 2009/0067396 A1* | 3/2009 | Fischer | ................. | H04L 1/1854 455/41.2 |
| 2018/0338345 A1* | 11/2018 | Lee | ....................... | H04W 84/12 |
| 2019/0082390 A1* | 3/2019 | Azizi | .................... | H04L 5/0007 |
| 2019/0268847 A1 | 8/2019 | Asterjadhi et al. | | |
| 2019/0306797 A1* | 10/2019 | Azizi | .................. | H04L 27/2603 |
| 2020/0287759 A1* | 9/2020 | Van Nee | ............. | H04L 27/2613 |
| 2021/0385688 A1 | 12/2021 | Liu et al. | | |
| 2023/0006787 A1 | 1/2023 | Yu et al. | | |
| 2023/0100553 A1* | 3/2023 | Jain | ...................... | H04W 12/084 370/329 |
| 2023/0104446 A1 | 4/2023 | Ajami et al. | | |
| 2023/0148403 A1 | 5/2023 | Fang et al. | | |
| 2023/0388165 A1 | 11/2023 | Yu et al. | | |

FOREIGN PATENT DOCUMENTS

AU    2013247949 B2    8/2017

OTHER PUBLICATIONS

International Search Report and Written Opinion for International Application No. PCT/US2024/035897, mailed Oct. 17, 2024, 14 Pages.

* cited by examiner

*Primary Examiner* — Khanh C Tran

(74) *Attorney, Agent, or Firm* — Patterson + Sheridan, LLP

(57) ABSTRACT

A format for a Physical layer Protocol Data Unit (PPDU) that can be transmitted over a network is disclosed. The PPDU includes one or more bits signaling that vendor-specific (VS) per-user content is present in the PPDU. The PPDU also includes one or more bits signaling a VS language in which the VS per-user content is presented. The PPDU further includes bits representing the VS per-user content in the VS language. The VS per-user content is arranged in the PPDU to provide individualized VS information for respective users intended to receive the PPDU.

20 Claims, 10 Drawing Sheets

PPDU FORMAT SUPPORTING VENDOR SPECIFIC PER-USER PARAMETERS

CROSS-REFERENCE TO RELATED APPLICATIONS

This application claims benefit of U.S. provisional patent application Ser. No. 63/512,550 filed Jul. 7, 2023. The aforementioned related patent application is herein incorporated by reference in its entirety.

TECHNICAL FIELD

Embodiments presented in this disclosure generally relate to Physical layer Protocol Data Units (PPDUs) that can be transmitted over a network, such as an IEEE 802.11 network.

BACKGROUND

Some IEEE 802.11 vendors seek to add proprietary Physical Layer (PHY) features to Physical layer Protocol Data Units (PPDUs), and to have such features understood by their other stations without confusing third-party stations on a network. Conventionally, vendors have utilized reserved bits in the PHY header signal fields to add such proprietary PHY features to a PPDU. However, the reserved bits in the PHY header are non-robust, especially for future amendments, because different vendors can use them in different ways. Haphazard use of the reserved bits can lead to confusion on the network.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
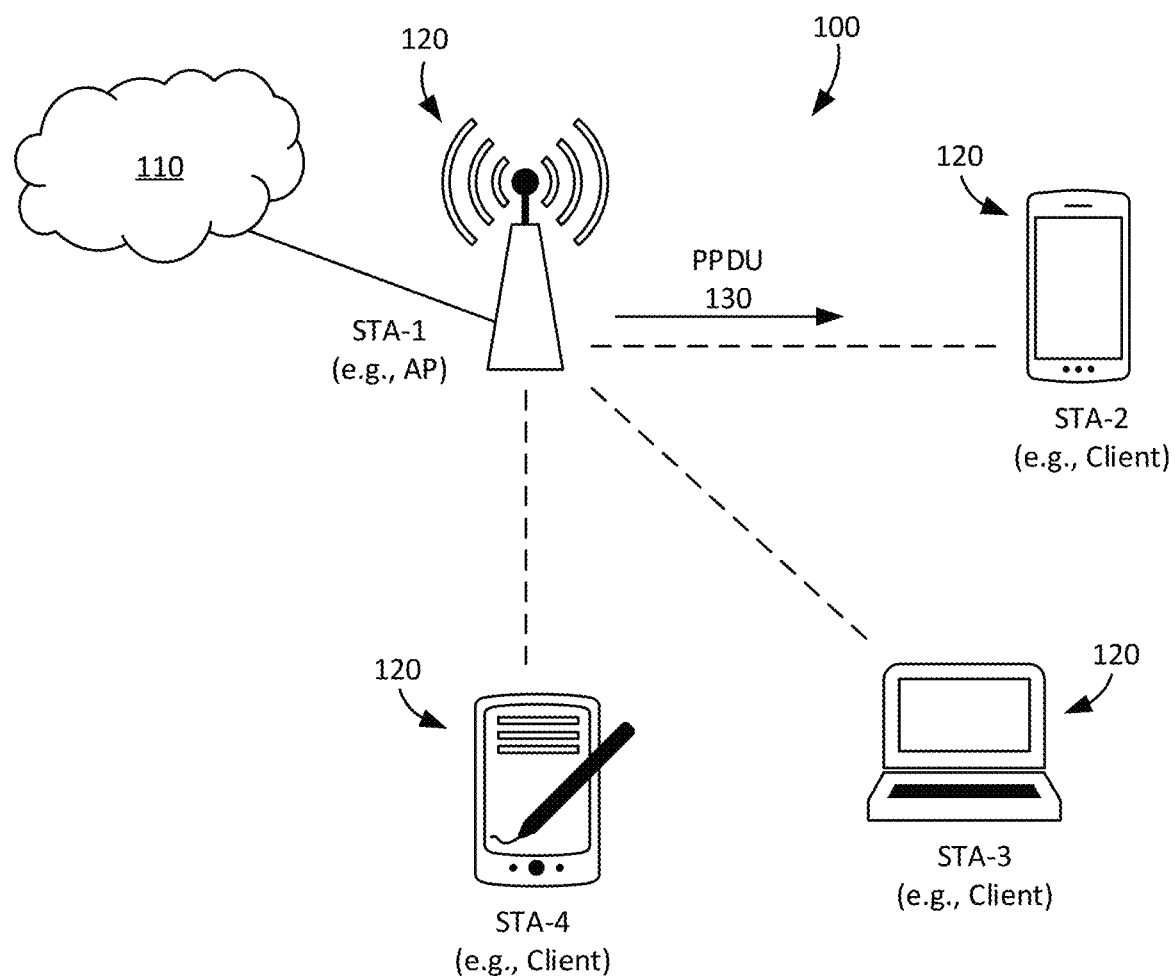
FIG. 1 is a schematic diagram of a wireless local area network (WLAN) system according to one or more embodiments.

One embodiment presented in this disclosure is a method. The method includes providing a physical layer protocol data unit (PPDU). The PPDU includes a payload and a preamble. The preamble includes one or more bits signaling that vendor-specific (VS) per-user content is present in the PPDU. The preamble also includes one or more bits signaling a VS language in which the VS per-user content is presented. The preamble further includes VS bits representing the VS per-user content in the VS language, the VS per-user content is arranged in the PPDU to provide individualized VS information for respective users intended to receive the PPDU. The method also includes transmitting the PPDU.

Another embodiment presented in this disclosure is a non-transitory, computer readable medium that includes instructions that, when executed by one or more processors, cause the one or more processors to perform an operation. The operation includes providing a physical layer protocol data unit (PPDU). The PPDU includes a payload and a preamble. The preamble includes one or more bits signaling that vendor-specific (VS) per-user content is present in the PPDU. The preamble also includes one or more bits signaling a VS language in which the VS per-user content is presented. The preamble further includes VS bits representing the VS per-user content in the VS language, the VS per-user content is arranged in the PPDU to provide individualized VS information for respective users intended to receive the PPDU. The operation further includes causing transmission of the PPDU.

Yet another embodiment presented in this disclosure is a station. The station includes one or more processors and one or more memory devices storing a program executable by the one or more processors to perform an operation. The operation includes providing a physical layer protocol data unit (PPDU). The PPDU includes a payload and a preamble. The preamble includes one or more bits signaling that vendor-specific (VS) per-user content is present in the PPDU. The preamble also includes one or more bits signaling a VS language in which the VS per-user content is presented. The preamble further includes VS bits representing the VS per-user content in the VS language, the VS per-user content is arranged in the PPDU to provide individualized VS information for respective users intended to receive the PPDU. The operation further includes causing transmission of the PPDU.

EXAMPLE EMBODIMENTS

A novel 802.11 Physical Layer (PHY) format for a Physical layer Protocol Data Unit (PPDU) is disclosed. In accordance with inventive aspects of this disclosure, a PPDU arranged in the novel format can include, among other things, (1) signaling features and (2) Vendor-Specific (VS) per-user content, or VS per-user content. The VS per-user content provides a means to send individualized or per-user VS information to respective users (or stations that receive the PPDU).

The signaling features can include one or more bits signaling whether vendor-specific (VS) per-user content is present in the PPDU. Such bits can be deemed VS per-user content indicator bit(s). In some embodiments, the VS per-user content indicator bit(s) can be included in a vendor-specific signal field, or VS-SIG field, but can also be located in other fields. The signaling features can also include one or more bits signaling a VS language in which the VS per-user content is presented. Such bits can be represented by a vendor table, which can include a list of vendors or implementers of the VS protocol presented in this disclosure. The vendor table can indicate an identity of the vendor transmitting the PPDU and the VS language in which the VS per-user content is presented.

The VS per-user content included the PPDU can be included in an Ultra High Reliability (UHR) signal field, or UHR-SIG field, but can also be located in other fields. More particularly, the VS per-user content can be located in the user field of various user encoding blocks. Each user encoding block can contain individualized VS content for a particular user. For instance, a first user can receive VS content specific to the first user, a second user can receive VS content specific to the second user, and so on. Stated another way, each user can receive individualized VS information. The VS per-user content can specify, for example, vendor-specific modulation orders, new Forward Error Correction (FEC) codes, how best to apply channel smoothing, additional features for improved ranging, new coding instructions, etc. The VS per-user content can also indicate a change in meaning of at least one existing per-user field or at least one existing per-user bit in the PPDU. The VS information specific to a user can be represented in the VS language that can be understood by only the vendor, and in some instances, one or more other vendors (e.g., a partner of the vendor).

A PPDU arranged in the novel format disclosed herein can advantageously allow for vendors to send VS information in a non-standard, VS language on a per-user or individualized basis—but according to a standardized protocol—so as not to affect operation of third-party stations that do not understand the VS language presented in the PPDU. Example embodiments detailing the inventive aspects are presented below.

FIG. 1 is a schematic diagram of an example Wireless Local Area Network (WLAN), or WLAN 100, according to one or more embodiments. In the depicted embodiment of FIG. 1, the WLAN 100 is configured as an IEEE 802.11 WLAN that is connected to a Wide Area Network (WAN), or WAN 110, such as the internet. For the depicted embodiment of FIG. 1, the WLAN 100 includes a plurality of stations (STAs) 120, including a first station STA-1, a second station STA-2, a third station STA-3, and a fourth station STA-4. The first station STA-1 is configured as an Access Point (AP) and the second, third, and fourth stations STA-2, STA-3, STA-4 are configured as clients that are wirelessly connected with the first station STA-1. The first station STA-1, or AP in this example embodiment, can manage the non-AP or client stations. More or less than four (4) stations can be included in the WLAN 100 in other example embodiments.

Any of the stations STA-1, STA-2, STA-3, STA-4 can generate and transmit a PPDU. One station can transmit a PPDU to one or more other stations. For instance, in FIG. 1, the first station STA-1 is shown transmitting a PPDU 130 to the second station STA-2. In accordance with inventive aspects of this disclosure, the PPDU 130 can have a unique 802.11 PHY format that includes, among other things, 1) signaling features that signal the presence of VS per-user content in the PPDU and the "vendor specific language" user; and 2) the individualized or per-user VS content for respective users or receiving stations (or a subset thereof) intended to receive the PPDU 130. Such features can allow for vendors to send vendor-specific data in a non-standard, vendor-specific language on a per-user or individualized basis. The PPDU 130 can be configured according one or some combination of the embodiments presented below.

Figure 2:
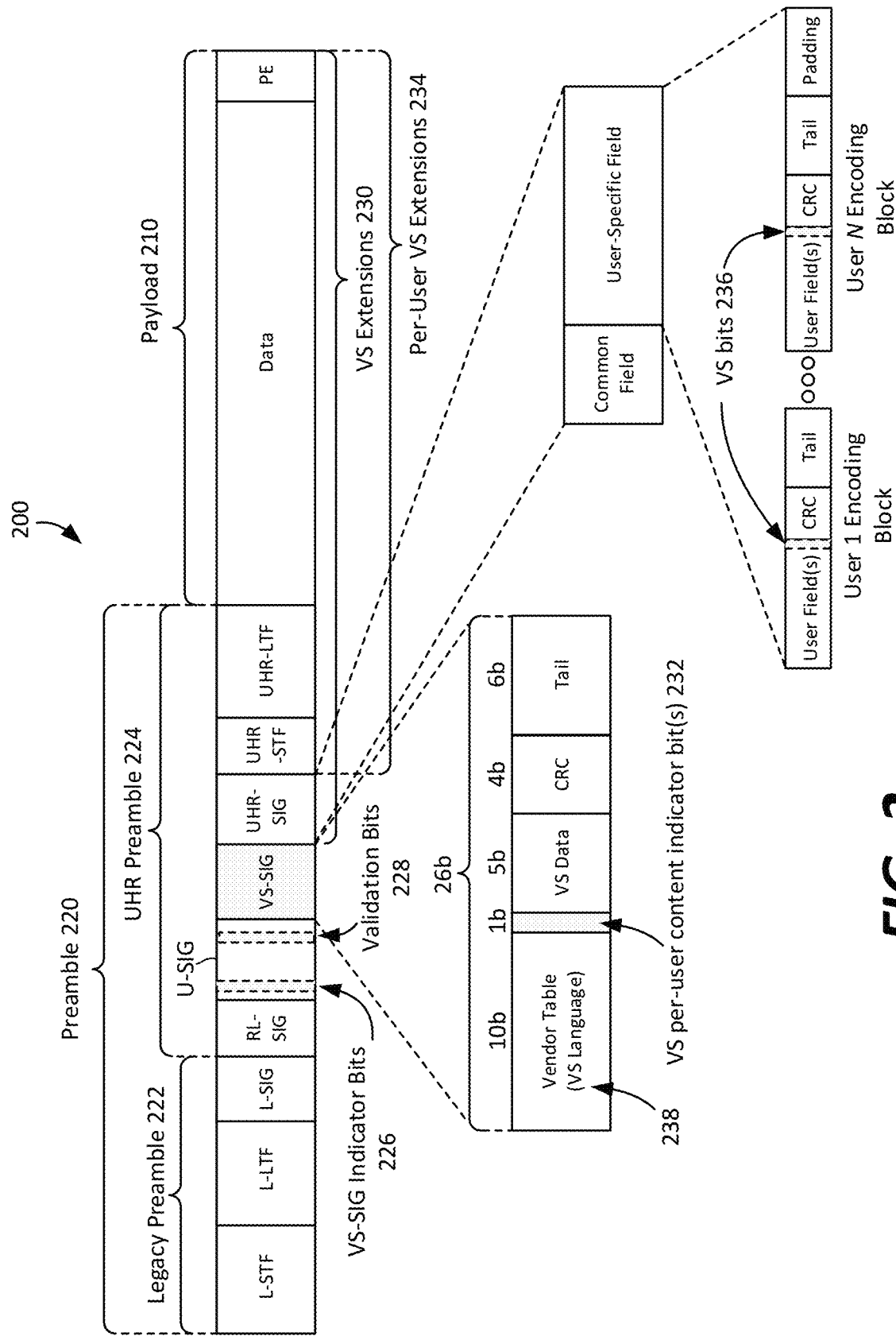
FIG. 2 is an example Physical layer Protocol Data Unit (PPDU) according to one or more embodiments.

FIG. 2 is an example PPDU 200 according to one or more embodiments. The PPDU 200 of FIG. 2 is configured as an example UHR PPDU for IEEE 802.11 applications. In other embodiments, the UHR fields can be replaced by the fields of another PHY amendment. Generally, the PPDU 200 includes a payload 210 and a preamble 220 that precedes the payload 210. The payload 210 generally includes a Data field that includes data (e.g., non-metadata) and a Packet Extension Field (PE) that terminates the PPDU 200.

For the depicted PPDU 200 of FIG. 2, the preamble 220 includes a legacy preamble 222 and format-specific signal fields, which are collectively referred to as an UHR preamble 224 in this example embodiment. The format-specific signal fields can also be referred to as a header. Although the inventive aspects disclosed herein are shown and described in the context of UHR or Wi-Fi8 amendments, the inventive aspects can also apply to future PHY amendments.

The legacy preamble 222 includes three (3) fields, including a Legacy Short Training Field (L-STF), a Legacy Long Training Field (L-LTF), and a Legacy Signal Field (L-SIG). The L-STF can include a unique waveform for detection by a receiver of the PPDU 200. The receiver, or receiving station, can use the waveform for initializing PPDU detection, automatic gain control, initial frequency offset estimation, initial time synchronization, a combination thereof, etc. The L-LTF includes a unique waveform as well, which is different from the L-STF waveform. A receiver of the PPDU 200 can use this waveform for channel estimation and more accurate frequency offset estimation and time synchronization. The L-SIG can include rate, length, and parity information associated with a legacy Orthogonal Frequency Division Multiplexing (OFDM) PPDU but is still used to indicate the duration of more modern PPDUs. The L-SIG can be represented by one OFDM symbol, for example.

The UHR preamble 224 includes various format-specific data fields as shown in FIG. 2. Particularly, the UHR preamble 224 includes a Repeated Legacy Signal Field (RL-SIG), a Universal Signal Field (U-SIG), a UHR Signal Field (UHR-SIG), a UHR Short Training Field (UHR-STF), and a UHR Long Training Field (UHR-LTF). Generally, such signal fields can include signaling data and training fields include waveforms for re-AGC, channel estimation, etc. In another embodiment, these UHR fields are replaced by the fields defined for another or future PHY amendment.

As shown in FIG. 2, the UHR-SIG includes a Common Field and a User-Specific Field. The User-Specific Field includes a plurality of user encoding blocks. The User-Specific Field can have N number of user encoding blocks, wherein N is an integer equal to or greater than one (1). Each user encoding block can include at least one User Field, a CRC, and a Tail. As will be described in greater detail herein, the UHR-SIG can include individualized or per-user vendor-specific content.

Some PPDUs can be generated with VS features whilst others may not. In this regard, optionally, a PPDU can be generated with a signaling feature that indicates whether a Vendor-Specific Signal Field (VS-SIG) is present in the PPDU. For the depicted embodiment of FIG. 2, the PPDU 200 includes one or more bits identifying whether a VS-SIG is present in the PPDU 200. Such bits can be deemed "VS-SIG indicator bits", or VS-SIG indicator bits 226. The VS-SIG indicator bits 226 identifying whether the VS-SIG is present in the PPDU 200 can be in the U-SIG as shown in FIG. 2, but, in other embodiments, the VS-SIG indicator bits 226 can be in another field, such as in any other field in the legacy preamble 222 or the UHR preamble 224 (or more broadly the format-specific signal fields). Also, as depicted in FIG. 2, the VS-SIG indicator bits 226 are in a field other than the VS-SIG itself.

In some embodiments, the VS-SIG indicator bits 226 can include a single bit that represents whether a VS-SIG is present in the PPDU. For instance, the single bit can represent a "YES" or a "NO" to identify whether the VS-SIG is present in the PPDU 200. In yet other embodiments, the VS-SIG indicator bits 226 can include a plurality of bits that can identify whether the VS-SIG is present in the PPDU 200 as well as other potential information associated with the VS-SIG, such as whether vendor-specific data in the VS-SIG is or should be configured or represented as one OFDM symbol or two OFDM symbols.

Figure 3:
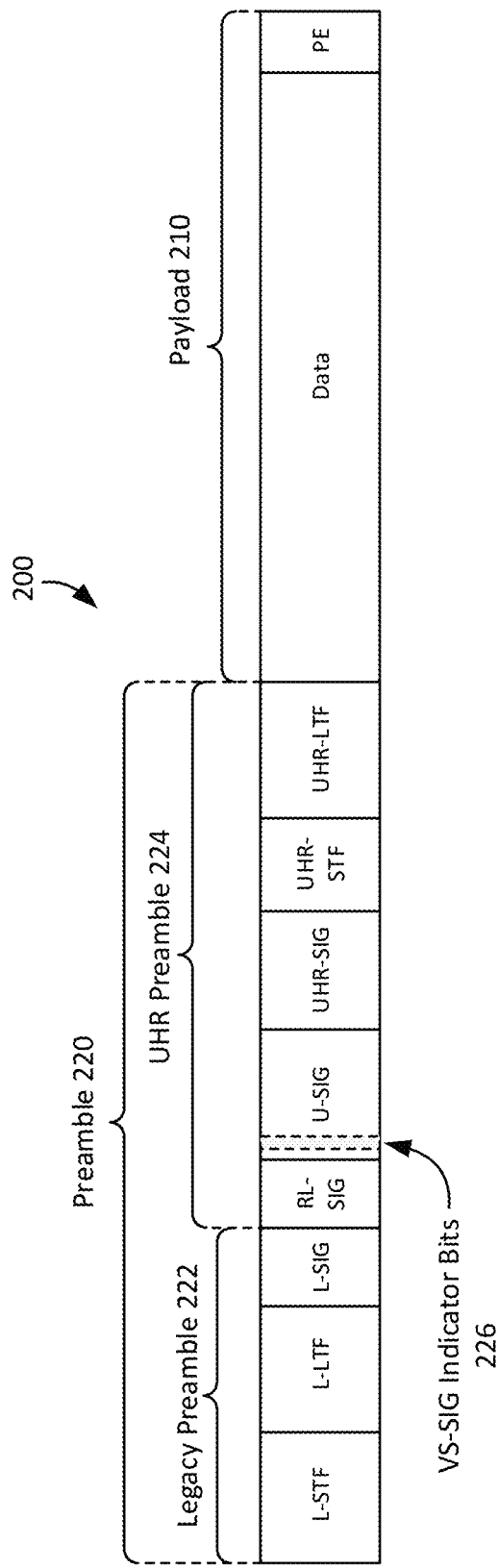
FIG. 3 is another example PPDU according to one or more embodiments.

In FIG. 2, the VS-SIG indicator bits 226 can represent that a VS-SIG is in fact present in the PPDU. Indeed, in FIG. 2, the VS-SIG is positioned between the U-SIG and the UHR-SIG. However, the VS-SIG can be positioned elsewhere in the preamble 220 of the PPDU 200, such as between the UHR-SIG and the UHR-STF. In some embodiments, even when a VS-SIG is not present in a PPDU, the PPDU can nevertheless include one or more bits identifying whether a VS-SIG is present in the PPDU. For instance, in FIG. 3, the PPDU 200 is shown without a VS-SIG. In such embodiments, the VS-SIG indicator bits 226 can indicate that there is no VS-SIG present in the PPDU 200.

With reference again to FIG. 2, in some embodiments, advantageously, the field having the VS-SIG indicator bits 226 is positioned before the VS-SIG, or rather, before the VS-SIG in the PPDU 200. In FIG. 2, the field (e.g., the U-SIG) having the VS-SIG indicator bits 226 is positioned before or forward of the VS-SIG. Such an arrangement allows a receiver, or receiving station, to know that the VS-SIG is present and, if so, then to demodulate, decode, and attempt to interpret the VS-SIG bits or to know that the VS-SIG field is not present and, if so, then skip directly to processing the next field. Further, embodiments are contemplated where the VS-SIG indicator bits 226 are in a field that is after the VS-SIG.

As further shown in FIG. 2, optionally, a PPDU can include one or more bits indicating whether a receiving station of the PPDU is required to perform a validation operation. Such bits can be deemed "validation bits", or validation bits 228, as illustrated in FIG. 2. The one or more validation bits 228 can be a separate field (1 bit in length) or associated with value(s) in a multi-bit field. For instance, in FIG. 2, the validation bits 228 are shown being present within the U-SIG. In other embodiments, the one or more validation bits 228 can be present within the VS-SIG itself, within its own dedicated field (or validate signaling field), or in some other field of the preamble 220. The one or more validation bits 228 are preferably positioned before the VS-SIG. Depending on whether validation is required to be performed by a receiving station of the PPDU 200 and whether the vendor-specific language, or VS language, in the PPDU 200 is understood or supported by the receiving station, the PPDU 200 can be processed differently by the receiving station. For instance, if there is no "validate signaling" in the PPDU 200 as signaled by the one or more validation bits 228, then the recipient or receiving station can process a VS-SIG (when present) if the recipient understands or supports at least one vendor-specific language and further only continue to process the remainder of the PPDU 200 if the recipient understands and at least minimally supports the specific vendor-specific language signaled in the validation bits 228 in the PPDU 200. The receiving station can process a PPDU normally when the VS language in the PPDU is not understood by the receiving station.

In the depicted embodiment of FIG. 2, the VS-SIG is represented by a single OFDM symbol and contains twenty-six (26) data bits and fifty-two (52) data subcarriers. The twenty-six (26) data bits can be modulated via Binary Phase-Shift Keying (BPSK)-r½, for example. In this regard, the VS-SIG can be a BPSK-modulated OFDM symbol. However, in alternative embodiments, other modulation schemes can be utilized.

Generally, the VS-SIG can include one or more bits identifying a vendor-specific language in which vendor-specific data is presented and one or more bits representing the vendor-specific data in the vendor-specific language. The vendor-specific language can be specific to a vendor or can be a language that the vendor and one or more other vendors are capable of understanding, such as by an agreement or by permission. The vendor-specific data can include vendor-specific metadata that provides instructions on how to process the rest of the PPDU, which, notably, can include vendor-specific extensions, such as a higher modulation, a waveform more amenable to a specific kind of channel smoothing, etc. The vendor-specific extensions, or VS extensions 230, are shown modifying the PPDU 200 in FIG. 2. In this regard, the VS extensions 230 are modifications to the PPDU 200 as instructed by VS metadata in the VS-SIG and are presented in the VS language. Particularly, the bits associated with the VS-SIG can be allocated into: a Vendor Table 238, VS per-user content indicator bit(s) 232, Vendor-Specific data (or VS data), a Cyclic Redundancy Check (CRC), and a Tail. In this example, ten (10) bits are allocated to the Vendor Table 238, one (1) bit is allocated to the VS per-user content indicator bit(s) 232, five (5) bits are allocated to the VS data, four (4) bits are allocated to the CRC, and six (6) bits are allocated to the Tail. It will be appreciated that this is one example allocation of bits and that other allocations are contemplated.

The Vendor Table 238 can include a list of the vendors or implementers of the vendor-specific protocol presented in this disclosure. The Vendor Table 238 can indicate an identity of the vendor transmitting the PPDU 200 (i.e., the vendor whose station is transmitting the PPDU 200) and the vendor-specific language associated with the transmitting vendor. This language may be shared with other vendors if the transmitting vendor wishes them to understand the vendor-specific language. Such other vendors can also be allowed to transmit using the first vendor's language, such that the Vendor Table doesn't necessarily indicate the identity of the vendor transmitting the PPDU and just indicates the vendor-specific language associated with the PPDU. Accordingly, the one or more bits identifying the VS language in the VS-SIG is represented by the Vendor Table 238. In this regard, the bits associated with the Vendor Table 238 can signal the VS language in which the VS data, and if applicable, the VS per-user content is presented.

The VS data can include data specific to the vendor that is represented in the vendor's specific language. The VS data can be metadata that describes or provides information relating to data included in the payload, for example. The CRC is a field used to detect errors in the VS-SIG. The Tail is used to terminate the binary convolutional code used in the VS-SIG. The Tail is six (6) bits to terminate the particular BCC code used in the other 802.11 signal fields and proposed here as a default encoding method, but other encoding method and their associated tail lengths are possible. In some embodiments, all fields of a PPDU after the VS-SIG are customized and the customizations are identified by the vendor-specific language. In some embodiments, if the VS-SIG is included in the PPDU, an extended duration of the PPDU can be indicated, for example, in the L-SIG and, if present, the RL-SIG too.

In some instances, it may be desirable to send the same VS data or information to a subset of stations (e.g., clients of the same vendor as the AP). However, in other instances, it may be desirable to send individualized or per-user VS information to the stations of the subset. Accordingly, the VS-SIG, when present, can include one or more bits signaling whether VS per-user content is present in the PPDU 200. These one or more bits, or VS per-user content indicator bit(s) 232, can indicate to receiving stations that individualized or per-user VS content is provided in the PPDU 200. In some embodiments, even when VS per-user content is not present in a PPDU, the PPDU can nevertheless include one or more bits identifying whether VS per-user content is present in the PPDU.

When the VS per-user content indicator bit(s) 232 indicate that no VS per-user content is present in the PPDU 200, the PPDU 200 can essentially provide "group-level" VS data to receiving stations capable of understanding the VS language. That is, the VS data is vendor specific to a group or subset of stations, but not individualized to specific users of the subset or group. However, when the VS per-user content indicator bit(s) 232 indicate that VS per-user content is present in the PPDU 200, the PPDU 200 can provide "individual-level" VS data or information to specific receiving stations, but optionally, can also simultaneously provide group-level VS data to other receiving stations capable of understanding the VS language. In this regard, the PPDU format of the PPDU 200 can provide enhanced flexibility for vendors to add proprietary PHY-layer features and allows for selectively-enabled VS content, at an individual and/or group level.

Accordingly, in accordance with inventive aspects of the present disclosure, the PPDU 200 can include 1) signaling features that signal the presence of VS per-user content in the PPDU and the "vendor specific language" used; and 2) individualized or per-user VS content for respective users or receiving stations (or a subset thereof) of the PPDU 200. The per-user VS content can include VS information specifically directed to a user, which may include one or more receiving stations. Specifically, the per-user VS content can provide vendor-specific metadata that provides instructions on how a specific user should process the rest of the PPDU, which, notably, can include individualized vendor-specific extensions, such as a higher modulation, a waveform more amenable to a specific kind of channel smoothing, etc. The individualized vendor-specific extensions, or per-user VS extensions 234, are shown modifying the PPDU 200 in FIG. 2 (the users receiving per-user VS content can have the same or different per-user VS extensions 234 depending on their specific per-user VS content). In this regard, the per-user VS extensions 234 are modifications to the PPDU 200 for a specific user as instructed by the VS metadata in the per-user VS content, with the per-user VS extensions 234 being presented in the VS language. The VS language in which the VS per-user content is presented can be signaled by one or more bits in the Vendor Table 238, for example. When a user or receiving station receives per-user VS content specifically directed thereto, the per-user VS extensions 234 trump or have a higher priority than the VS extensions 230. In some embodiments, a receiving station can store a received PPDU and then reprocess it according to the per-user VS extensions 234. Examples detailing how the signaling features and the individualized per-user VS content can be arranged in a PPDU are provided below.

Figure 4:
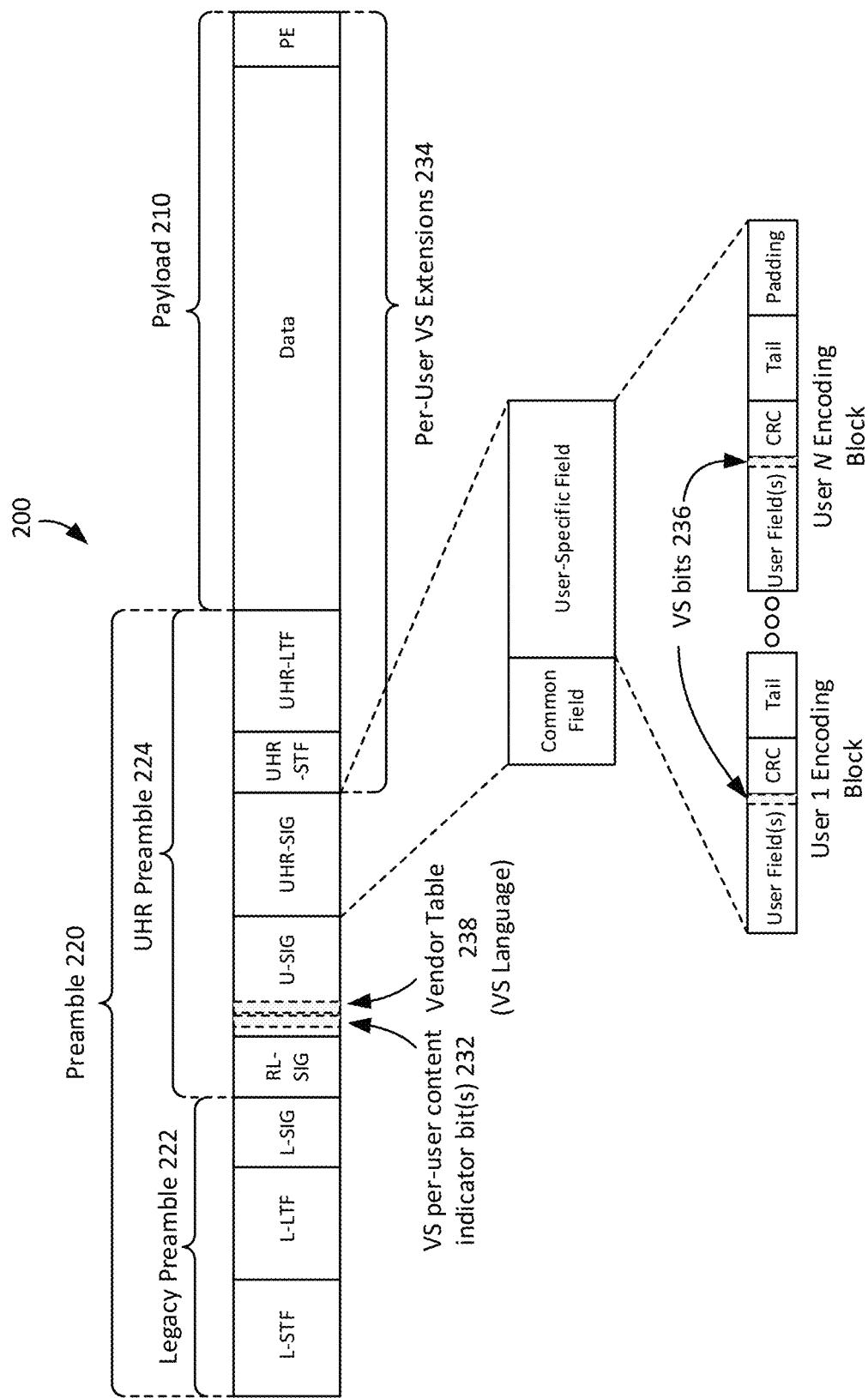
FIG. 4 is another example PPDU according to one or more embodiments.

Generally, the bits signaling whether VS per-user content is present in a PPDU and the VS language in which the VS per-user content is presented can be presented in the UHR preamble 224. In some embodiments, as shown in FIG. 2, the bits signaling that the VS per-user content is present in the PPDU 200 and the VS language in which the VS per-user content is presented are included in the VS-SIG. Particularly, in FIG. 2, the VS per-user content indicator bit(s) 232 and the Vendor Table 238 are shown in the VS-SIG. In alternative embodiments, the bits signaling that the VS per-user content is present in the PPDU and the VS language in which the VS per-user content is presented can be included in another field of the PPDU 200, such as the U-SIG. As shown in FIG. 4, the VS per-user content indicator bit(s) 232 and the Vendor Table 238 are included in the U-SIG. Here, no VS-SIG is defined (so no VS-SIG Indicator bits either). In this way, there is no VS Data for all users, and only VS bits for each individual user. In a further embodiment, with the greatest flexibility, a VS SIG field is defined, and the trio of VS-SIG Indicator bits, Vendor Table, and VS-SIG per-user content indicator are all present outside the VS-SIG (e.g., in the U-SIG). In this embodiment, the VS-SIG contains VS Data, CRC, and Tail but no Vendor Table; and then each PPDU can contain, or not, user-undifferentiated VS metadata in the VS Data and the same PPDU can contain, or not, per-user metadata elsewhere in the PPDU.

With reference to FIG. 2, in some embodiments, the one or more bits signaling that the VS per-user content is present in the PPDU, or VS per-user content indicator bit(s) 232, can indicate a number of VS bits per user. In such embodiments, the same number of VS bits can be assigned to each user or receiving station. In a first example, the VS per-user content indicator bit(s) 232 can include one (1) bit, e.g., as in the embodiment of FIG. 2. The 1 bit can be encoded as either a zero (0) or a one (1). When the 1 bit is encoded as a zero (0), this can indicate that there are zero (0) VS bits per user, or rather, that there is no VS per-user content present in the PPDU 200. When the 1 bit is encoded as a one (1), this can indicate that there are A number of VS bits per user, wherein N is an integer, such as one (1), four (4), or sixteen (16). In a second example, the VS per-user content indicator bit(s) 232 can include a plurality of bits. Each bit can be encoded as either a zero (0) or a one (1). When the bits are encoded as zero-zero (0, 0), this can indicate that there are zero (0) VS bits per user, or rather, that there is no VS per-user content present in the PPDU 200. When the bits are encoded as zero-one (0, 1), this can indicate that there is one (1) VS bit per user. When the bits are encoded as one-zero (1, 0), this can indicate that there are four (4) VS bits per user. Finally, when the bits are encoded as one-one (1, 1), this can indicate that there are sixteen (16) VS bits per user. In other examples, the VS per-user content indicator bit(s) 232 can include more than two bits to provide further flexibility to the number of VS bits that can be assigned per user and/or the number of bits indicated by the VS per-user content indicator bit(s) 232 can vary from 0/1/4/16.

In yet other embodiments, the one or more bits signaling that the VS per-user content is present in the PPDU, or VS per-user content indicator bit(s) 232, can indicate a number of VS bits per user encoding block. In such embodiments, the same number of VS bits can be assigned to each user encoding block. In a first example, the VS per-user content indicator bit(s) 232 can include one (1) bit. The 1 bit can be encoded as either a zero (0) or a one (1). When the 1 bit is encoded as a zero (0), this can indicate that there are zero (0) VS bits per user encoding block, or rather, that there is no VS per-user content present in the user encoding blocks of the PPDU 200. When the 1 bit is encoded as a one (1), this can indicate that there are A number of VS bits per user encoding block, wherein N is an integer, such as two (2), eight (8), or thirty-two (32). In a second example, the VS per-user content indicator bit(s) 232 can include a plurality of bits. Each bit can be encoded as either a zero (0) or a one (1). When the bits are encoded as zero-zero (0, 0), this can indicate that there are zero (0) VS bits per user encoding block. When the bits are encoded as zero-one (0, 1), this can indicate that there is two (2) VS bits per user encoding block. When the bits are encoded as one-zero (1, 0), this can indicate that there are eight (8) VS bits per user encoding block. Finally, when the bits are encoded as one-one (1, 1), this can indicate that there are thirty-two (32) VS bits per user encoding block. In other examples, the VS per-user content indicator bit(s) 232 can include more than two bits to provide further flexibility to the number of VS bits that can be assigned per user encoding block and/or the number of bits indicated by the VS bits per user encoding block indicator bit(s) 232 can vary from 0/2/8/32.

In some other embodiments, the one or more bits signaling that the VS per-user content is present in the PPDU, or VS per-user content indicator bit(s) 232, can indicate a number of extra user fields or user encoding blocks per content channel in a signal field containing the per-user VS content. As a first example, the VS per-user content indicator bit(s) 232, which can be included in the U-SIG or the VS-SIG, can indicate a number of extra user fields per content channel in the UHR-SIG containing per-user VS content. As a second example, the VS per-user content indicator bit(s) 232 can indicate a number of extra user encoding blocks per content channel in the UHR-SIG containing per-user VS content.

In yet other embodiments, the one or more bits signaling that the VS per-user content is present in the PPDU, or VS per-user content indicator bit(s) 232, can indicate a number of extra OFDM symbols in a signal field containing the per-user VS content. As an example, the VS per-user content indicator bit(s) 232, which can be included in the U-SIG or the VS-SIG, can indicate a number of extra OFDM symbols in the UHR-SIG containing the per-user VS content. Optionally, in addition to the number of extra OFDM symbols, the VS per-user content indicator bit(s) 232 can indicate a modulation coding scheme associated with the per-user VS content.

As noted above, the PPDU 200 can include VS per-user content. Particularly, the PPDU 200 can include bits representing the VS per-user content in the VS language. The VS per-user content can be arranged in the PPDU 200 to provide individualized VS information for a plurality of users intended to receive the PPDU. That is, the PPDU 200 can provide respective VS information to a plurality of users, or receiving stations, of the PPDU 200. The per-user VS content can include or can be vendor-specific metadata that provides instructions on how a specific user should process the rest of the PPDU 200. The VS per-user content can indicate, as non-limiting examples, a modulation scheme to implement, new Forward Error Correction (FEC) codes, a technique for applying channel smoothing, features of improved ranging, a change in meaning of at least one existing per-user field or existing per-user bit(s) in the PPDU, etc.

In some embodiments, the PPDU 200 includes individualized VS information for at least a first user and a second user, wherein the individualized VS information for the first user is different than the individualized VS information for the second user. In some other embodiments, the PPDU 200 includes individualized VS information for at least a first user and a second user, wherein the individualized VS information for the first user is the same as the individualized VS information for the second user. In yet further embodiments, the PPDU 200 includes individualized VS information for at least a first user, a second user, and a third user, wherein the individualized VS information for the first user is the same as the individualized VS information for the second user but different than the individualized VS information for the third user. Example manners in which the bits representing the VS per-user content in the VS language can be arranged in a PPDU will be provided below.

In some embodiments, each user field or user encoding block can be added (e.g., pre-pended, mid-pended, and/or appended) with bits of per-user VS content. That is, the bits representing the VS per-user content in the VS language are included in user fields or user encoding blocks that are each dedicated to respective users intended to receive the PPDU 200. In such embodiments, the bits representing the VS per-user content in the VS language are appended to existing bits of the user fields or the user encoding blocks. By way of example, FIG. 2 depicts the UHR-SIG field in detail. As shown, the UHR-SIG field includes a Common Field and a User-Specific Field. The User-Specific Field includes a plurality of user encoding blocks. The User-Specific Field can have N number of user encoding blocks, wherein N is an integer equal to or greater than one (1). Each user encoding block can include at least one User Field, a CRC, and a Tail. As depicted, the bits representing the VS per-user content in the VS language, or VS bits 236, are appended to the User Field of each user encoding block. The VS bits 236 appended to a given user encoding block can include the same or different VS information than the VS bits 236 appended to any other user encoding block.

Figure 5:
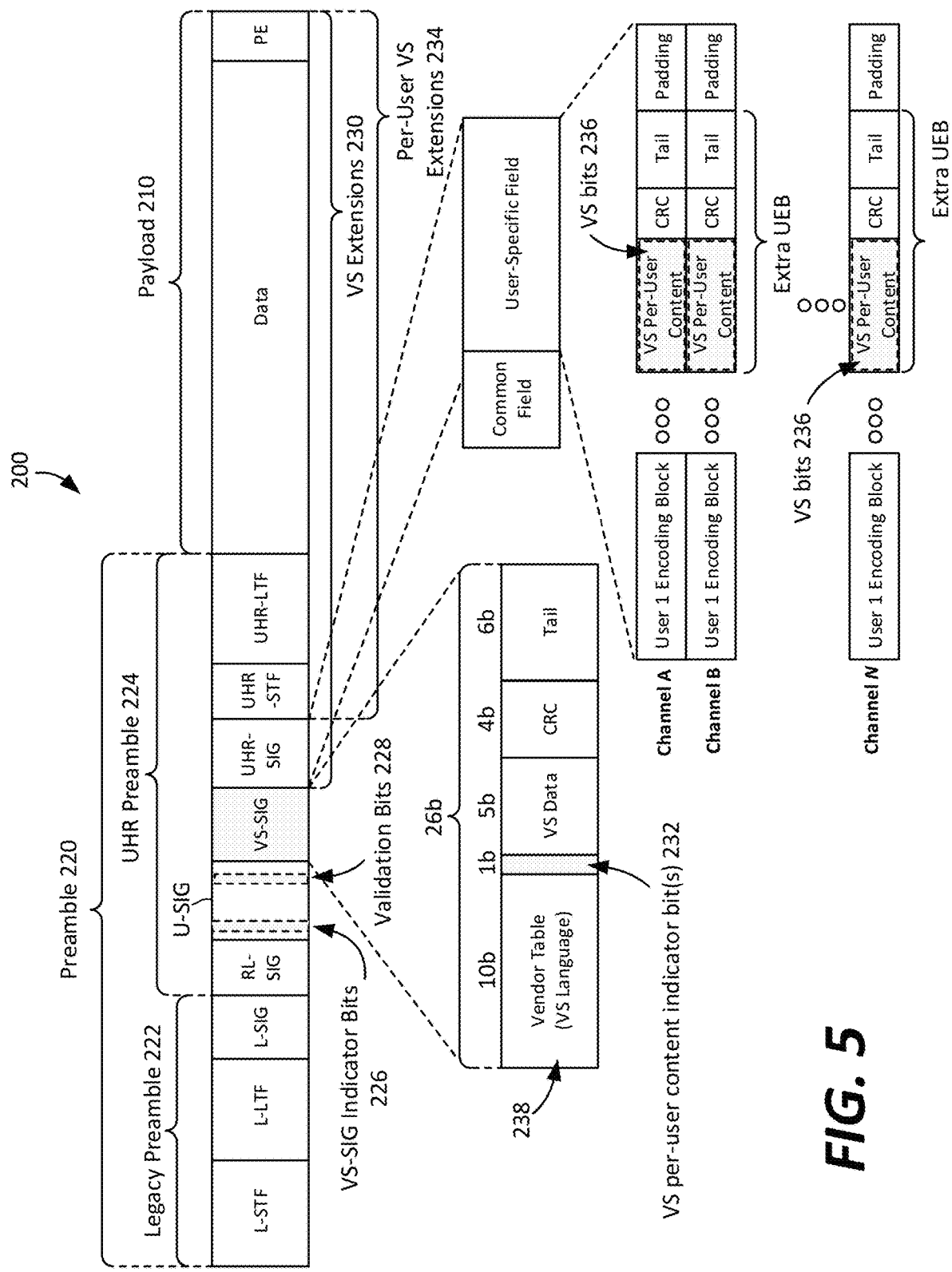
FIG. 5 is another example PPDU according to one or more embodiments.

In some further embodiments, the per-user VS content can be included in extra user fields or user encoding blocks at the end of each content channel in the UHR-SIG. That is, the bits representing the VS per-user content in the VS language can be included in extra user fields or extra user encoding blocks at the end of each content channel in a signal field (e.g., the UHR-SIG field). By way of example, FIG. 5 depicts the User-Specific Field of the UHR-SIG field having a plurality of content channels, including Channel A, Channel B, and so on to Channel N. Each content channel can have a plurality of user encoding blocks and padding at their respective ends. For this example, each content channel includes one or more extra user encoding blocks ("Extra UEB"), and as depicted, the VS bits 236 can be included in the user fields of the respective extra user encoding blocks. In such embodiments, the content can be sent as normally-sized user fields or user encoding blocks, with unchanged CRC and Tail fields, but the VS per-user content can be organized as a linearized version of: 1) a product of a number of users per content channel and a number of VS bits per user; or 2) a product of a number of users that understand the VS per-user content and a number of VS bits per user. The VS per-user content can be fragmented so that each fragment fits into available bits in respective ones of the extra user fields or the extra user encoding blocks. In some embodiments, the VS per-user content can be organized according to a bitmap, which can be presented in a field or distributed across the per-user fields, that indicates which users have VS per-user content (e.g., M users in all) followed by: M multiplied by a number of VS bits per-user of VS content.

Figure 6:
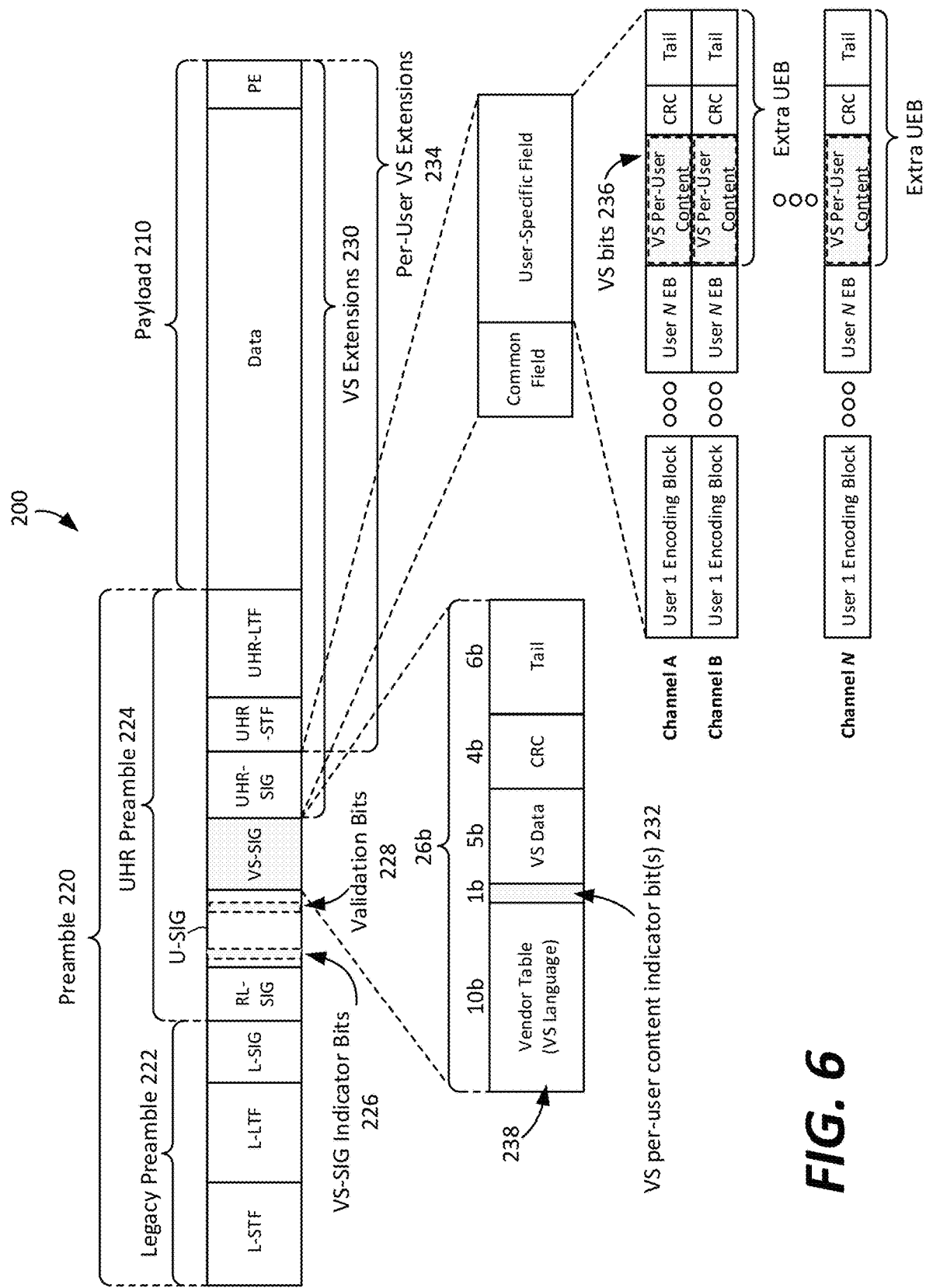
FIG. 6 is another example PPDU according to one or more embodiments.

In other embodiments, the per-user VS content can take the place of, or be included in, padding at the end of a signal field, such as the UHR-SIG field. That is, the bits representing the VS per-user content in the VS language can be included in, or take the place of, padding at an end of a signal field. For instance, as shown in FIG. 6, the VS per-user content has taken the place of the normal padding (compare with FIG. 5 showing the padding at the end of each content channel), and can be organized as VS per-user content+ CRC+Tail. The VS per-user content can be organized as a linearized version of: 1) a product of a number of users per content channel and a number of VS bits per user; or 2) a product of a number of users that understand the VS per-user content and a number of VS bits per user. In some embodiments, the VS per-user content can be organized according to a bitmap, which can be presented in a single field or distributed across many fields, that indicates which users have VS per-user content (e.g., M users in all) followed by: M multiplied by a number of VS bits per-user of VS content.

In yet other embodiments, the per-user VS content can be included in a dedicated Per-User VS-SIG field. That is, the bits representing the VS per-user content in the VS language can be included in a dedicated per-user VS signal field, or Per-User VS-SIG field. The Per-User VS-SIG field can be located immediately after the UHR-SIG field, for example.

Figure 7A:
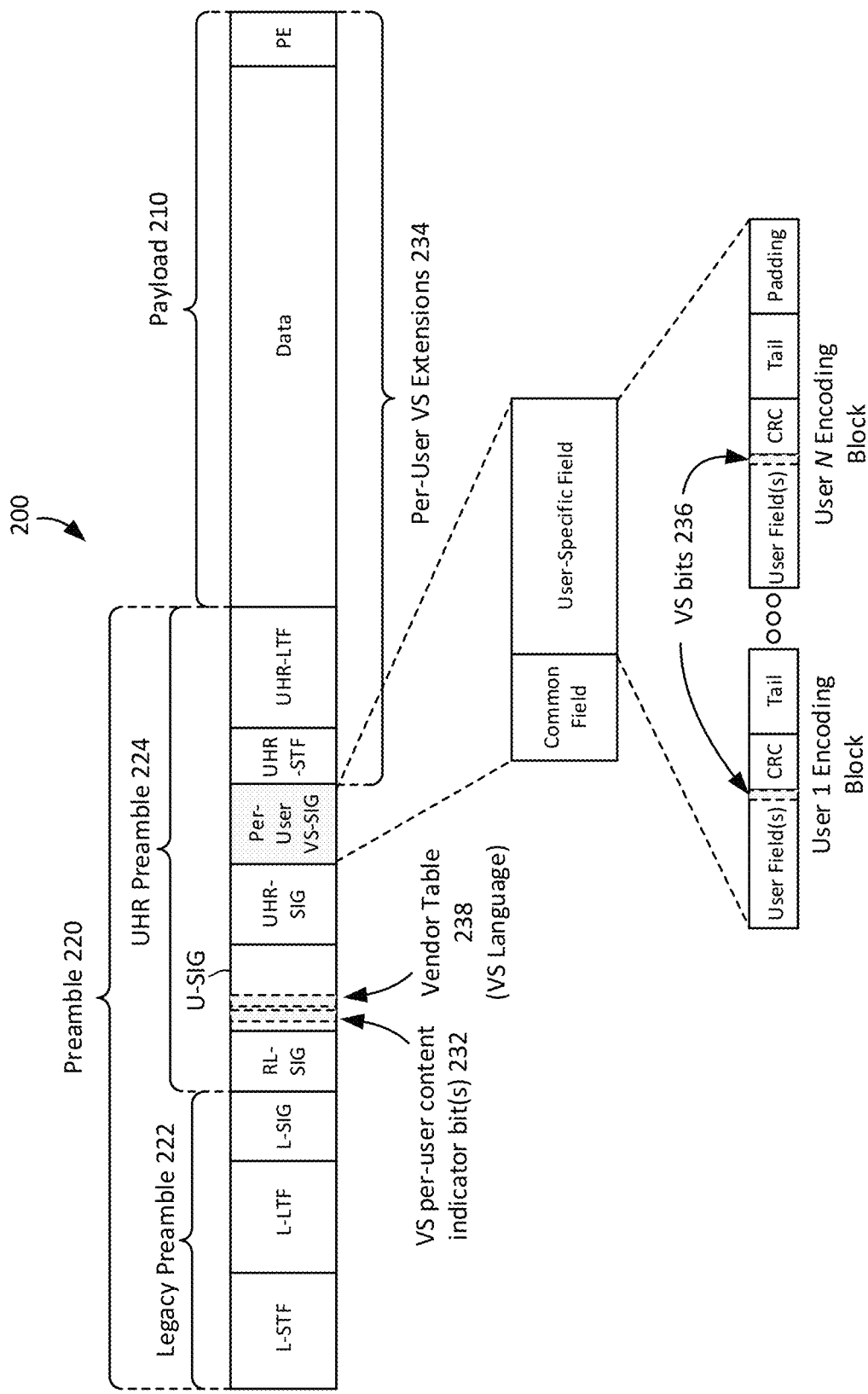
FIG. 7A is another example PPDU according to one or more embodiments.

As a first example, the dedicated Per-User VS-SIG field can include a plurality of user fields or a plurality of encoding blocks each dedicated to one or more users of the plurality of users. Each of these user fields or user encoding blocks can include VS bits 236. FIG. 7A shows one example PPDU 200 having a Per-User VS-SIG field. The Per-User VS-SIG field can be constructed in a similar manner as the UHR-SIG field of FIG. 2. Particularly, the Per-User VS-SIG field of FIG. 7A can include a Common Field and a User-Specific Field. The User-Specific Field includes a plurality of user encoding blocks. The User-Specific Field can have A number of user encoding blocks, wherein N is an integer equal to or greater than one (1). Each user encoding block can include at least one User Field, a CRC, and a Tail. As depicted, the VS bits 236 can be included in the User Field(s) of each user encoding block. The VS bits 236 of a given User Field or user encoding block can include the same or different VS information than the VS bits 236 of any User Field of user encoding block.

Although FIG. 7A shows a Per-User VS-SIG field to provide individualized or "individual level" per-user VS content to receiving stations or users, it will be appreciated that, in other embodiments, the PPDU 200 of FIG. 7A can have a VS-SIG to provide "group level" VS content to some receiving stations or users. In this regard, in some embodiments, the PPDU 200 can include both individualized per-user VS content and group level VS content. In such embodiments, receiving stations can prioritize the individualized per-user VS content over the group level VS content.

Figure 7B:
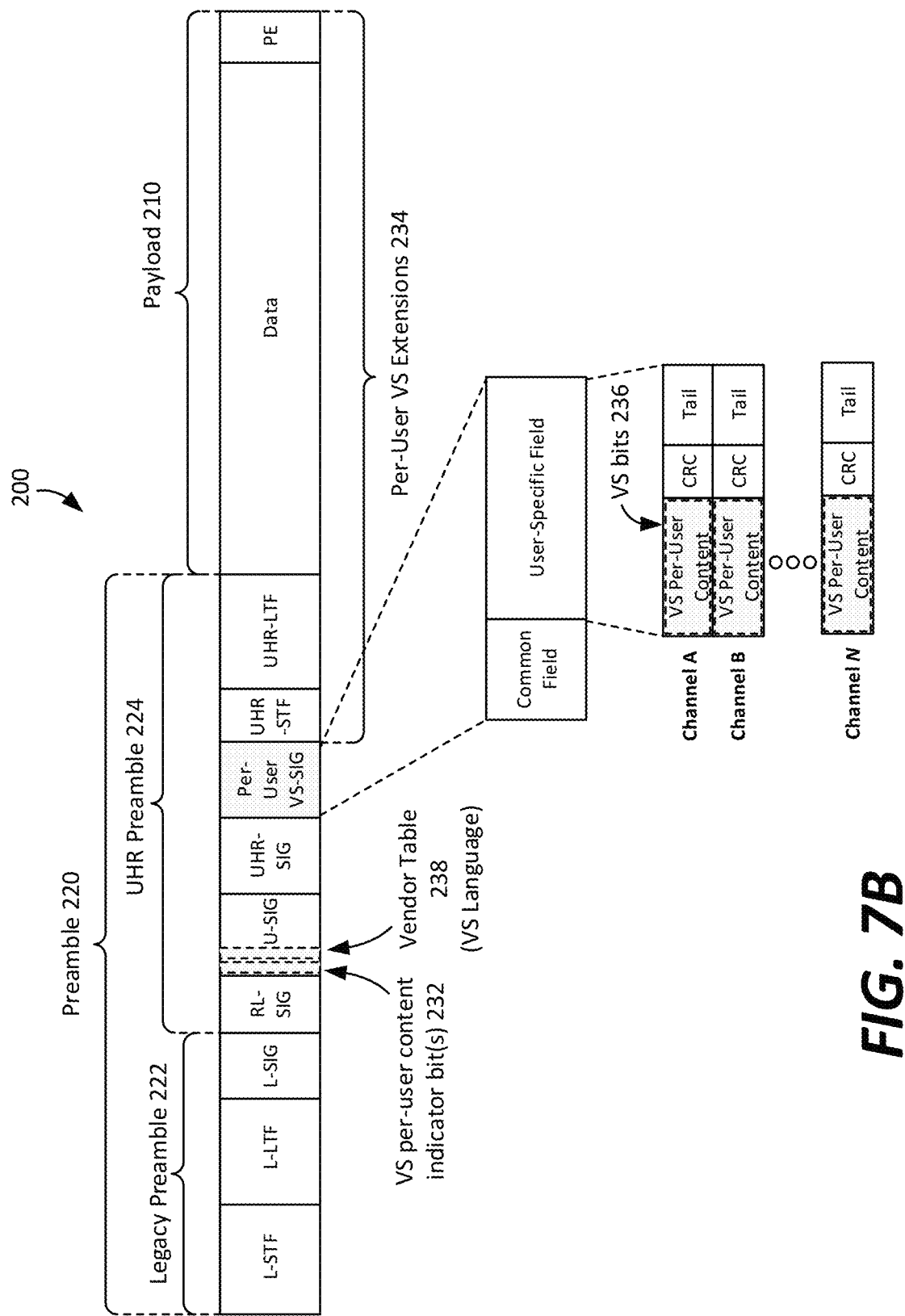
FIG. 7B is another example PPDU according to one or more embodiments.

As a second example, the dedicated Per-User VS-SIG field can include a single instance of VS Per-User Content+ CRC+Tail per content channel, e.g., as shown in FIG. 7B. The VS Per-User Content can be organized as a linearized version of: 1) a product of a number of users per content channel and a number of VS bits per user; or 2) a product of a number of users that understand the VS per-user content and a number of VS bits per user. In some embodiments, the VS per-user content can be organized according to a bitmap. Although FIG. 7B shows a Per-User VS-SIG field to provide individualized or "individual level" per-user VS content to receiving stations or users, it will be appreciated that, in other embodiments, the PPDU 200 of FIG. 7B can have a VS-SIG to provide "group level" VS content to some receiving stations or users. In this regard, in some embodiments, the PPDU 200 can include both individualized per-user VS content and group level VS content. In such embodiments, receiving stations can prioritize the individualized per-user VS content over the group level VS content.

In some further example embodiments, a preamble of a PPDU can include a "complete" VS-SIG field that includes the Vendor Table, VS group-level content, and VS per-user content. The complete VS-SIG can also include or indicate a number of VS bits per-user. The complete VS-SIG can be of variable length; accordingly, indicator bits can specify every possible length and/or allow for coarse length options with padding.

Figure 8:
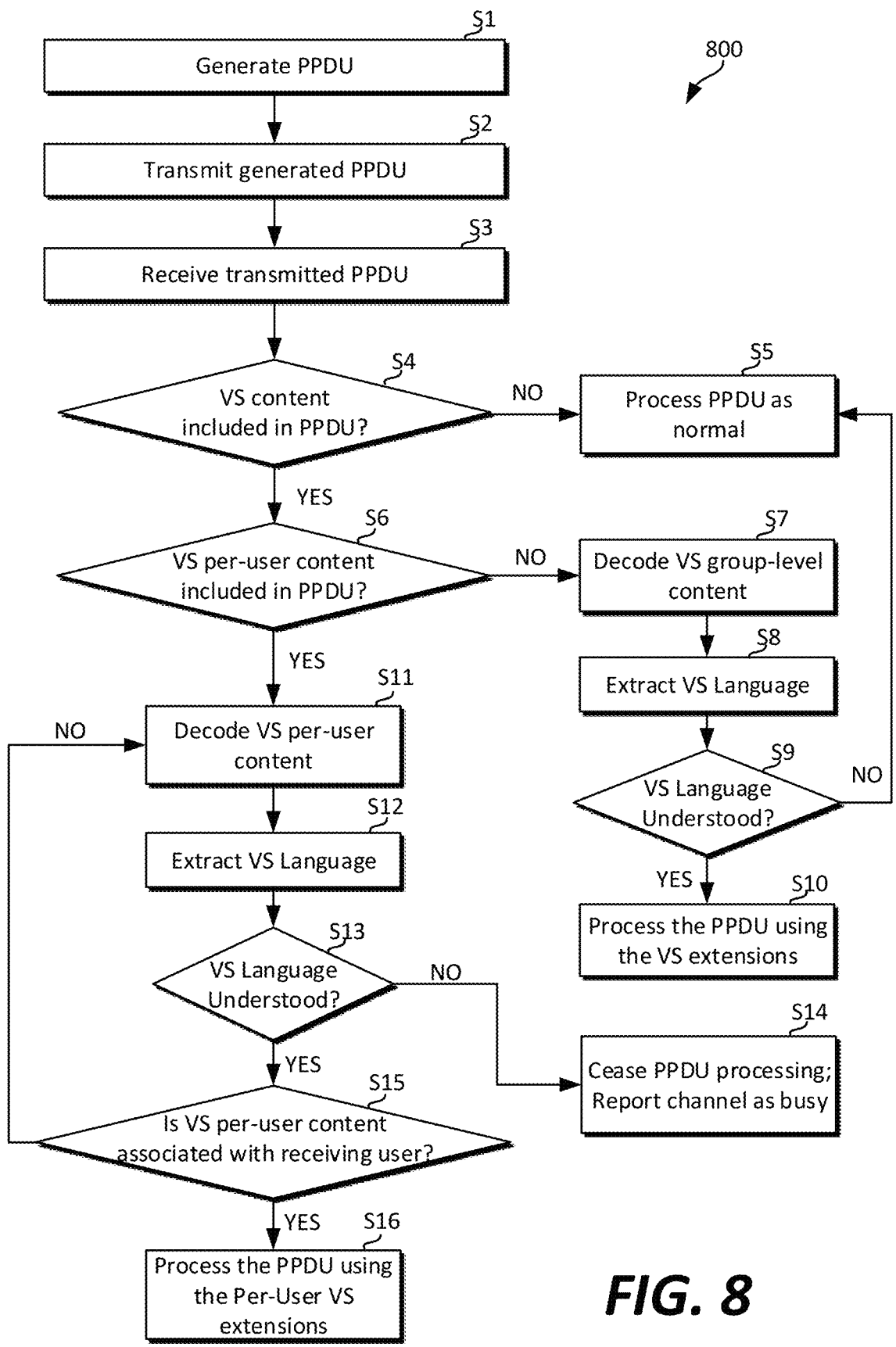
FIG. 8 is a flow diagram for a method according to one or more embodiments.

FIG. 8 is a flow diagram for a method 800 according to one or more embodiments.

At S1, the method 800 can include providing, by a first station, a PPDU. For instance, one or more processors of the first station, in executing instructions stored on one or more non-transitory memory devices of the first station, can cause the PPDU to be generated or provided. In some implementations, the first station can be an access point of an IEEE 802.11 wireless network. In other implementations, the first station can be a client of an access point associated with an IEEE 802.11 wireless network.

Providing the PPDU can include generating the PPDU to include a payload and a preamble. The preamble can include bits signaling (i) that vendor-specific (VS) per-user content is present in the PPDU and (ii) a VS language in which the VS per-user content is presented. The preamble can also include bits representing the VS per-user content in the VS language. The VS per-user content is arranged in the PPDU to provide individualized VS information for respective users intended to receive the PPDU.

At S2, the method 800 can include transmitting, by the first station, the PPDU. For instance, one or more processors of the first station, in executing instructions stored on the one or more non-transitory memory devices of the first station, can cause the PPDU to be transmitted, e.g., over an IEEE 802.11 wireless network. The first station can transmit the PPDU to one or more other stations, such as a second station and a third station.

At S3, the method 800 can include receiving, by at least one other station, such as a second station and a third station, the transmitted PPDU. For instance, one or more processors of the second station, in executing instructions stored on one or more non-transitory memory devices of the second station, can receive the transmitted PPDU. Likewise, one or more processors of the third station, in executing instructions stored on one or more non-transitory memory devices of the third station, can receive the transmitted PPDU.

At S4, the method 800 can include determining, by each station that received the PPDU, whether the transmitted PPDU contains VS content. In some instances, a PPDU can include VS "group-level" content provided to a group or subset of users who understand the VS language utilized in the PPDU. In some instances, in addition or alternatively to the VS group-level content, the PPDU can include VS per-user content that is specifically provided for individual users. In yet other instances, the PPDU may not contain any VS content. When a given user or receiving station determines that there is no VS content in the PPDU, the method 800 can proceed to S5. When a given user determines that VS content is included in the PPDU, the method 800 can proceed to S6. The PPDU can include indicator bits that indicate whether VS content is provided in the PPDU.

At S5, in response to a given station determining at S4 that the transmitted PPDU does not contain VS content, the method 800 can include processing the PPDU as normal, or rather, according to one or more known IEEE 802.11 protocols. For example, the one or more processors of the second station can, upon determining that the transmitted PPDU does not contain the VS content, process the PPDU as normal, e.g., in view of the common language represented in the PPDU.

At S6, the method 800 can include determining, by each station that received the PPDU, whether the transmitted PPDU contains per-user VS content. For instance, the one or more processors of the second and/or third stations can respectively determine whether the transmitted PPDU contains per-user VS content, e.g., by processing the VS per-user content indicator bits. By processing the VS per-user content indicator bits, the one or more processors of the second and/or third stations can determine whether per-user VS content is present in the received PPDU. When the per-user indicator bits indicate that per-user VS content is present in the PPDU, the method 800 proceeds to S10. When the per-user indicator bits indicate that no per-user VS content is present in the PPDU, the method 800 proceeds to S7 so that the VS all-user content, or VS data, can be processed.

At S7, the method 800 can include decoding the VS group-level content, which can be in a VS-SIG of the PPDU, for example. For instance, the one or more processors of the given station can, upon determining that the transmitted PPDU contains the VS group-level content (and not VS per-user content), decode the VS-SIG. Any suitable decoding technique can be utilized.

At S8, the method 800 can include extracting the vendor-specific language, or VS Language, utilized in the PPDU for the VS group-level content. For instance, the one or more processors of the given station can, after decoding the VS group-level content, extract the VS language. For instance, the one or more processors can process a vendor table of a VS-SIG of the PPDU. The vendor table can include bits that identify the vendor of the transmitting station (e.g., the first station) and the VS language associated with the vendor. In some implementations, the vendors can have at least one uniquely assigned VS language. Some vendors can have multiple unique VS languages.

At S9, the method 800 can include determining, by a given receiving station, whether the receiving station understands the VS language in which the VS group-level content is provided. When the receiving station determines that the VS language is not understood, the method 800 can proceed to S5 where the PPDU can be processed as normal. When the receiving station determines that the VS language is understood, the method 800 can proceed to S10 where the PPDU can be processed according to the group-level VS extensions (e.g., VS extensions 230 in FIG. 2).

At S10, the method 800 can include, in response to the given station determining at S9 that the VS language associated with the VS group-level content is understood, processing the VS group-level content according to group-level VS extensions.

At S11, in response to the given station determining at S6 that the transmitted PPDU does contain VS per-user content, the method 800 can include decoding the VS per-user content, which can be in a UHR-SIG, for example. For instance, the one or more processors of the given station can, upon determining that the transmitted PPDU contains the VS per-user content, decode the VS-SIG. Any suitable decoding technique can be utilized.

At S12, the method 800 can include extracting the vendor-specific language, or VS Language, utilized in the PPDU. For instance, the one or more processors of the given station can, after decoding the VS per-user content, extract the VS language. For instance, the one or more processors can process a vendor table of a VS-SIG of the PPDU. The vendor table, or vendor-language table, can include bits that identify the vendor of the transmitting station (e.g., the first station) and the VS language associated with the vendor. In some implementations, the vendors can have at least one uniquely assigned VS language. Some vendors can have multiple unique VS languages.

At S13, the method 800 can include determining, by a given receiving station, whether the receiving station understands the VS language in which the VS per-user content is provided. When the receiving station determines that the VS language is not understood, the method 800 can proceed to S14 where the PPDU can cease processing the PPDU and can report the channel as busy. When the receiving station determines that the VS language is understood, the method 800 can proceed to S15.

At S14, in response to the receiving station determining that the VS language is not understood at S13, the method 800 can include ceasing processing of the PPDU and reporting a channel as busy. By way of example, two nearby co-channel APs, AP1 and AP2, each have two clients C1 and C2, respectively, and C1 and C2 have the same STA identifier (STAID), which can be a non-globally-unique identifier used in the per-user field to identify the recipient. In this example, C2 understands the VS language but C1 does not. In this example, AP2 transmits a PPDU to C2 that utilizes the VS language. C2 understands the VS language, and when the VS per-user content is associated with C2, C2 processes the PPDU according to the per-user VS extensions (e.g., at S15 and S16). C1 sees the PPDU transmitted by AP2 and understands that it could be a recipient user given the matching STAID. C1 tries to process the PPDU but hits the unknown VS language at S13. At this point, C1 reports the channel as busy for the duration of the PPDU and does not further process it at S14.

At S15, the method 800 can include ascertaining, by the given station, whether the extracted VS per-user content is supported and associated with the given station. For instance, the one or more processors of the given station can ascertain whether the given station understands or is at least minimally supports the feature indicated by the extracted VS per-user content presented in the PPDU. If understood, the one or more processors of the given station can ascertain whether the VS per-user content is specifically directed to the given station (and not some other station).

In response to the given station ascertaining at S15 that the extracted VS per-user content is not meant for or associated with the given station, the method 800 can include moving to the next VS per-user content to determine if the next VS per-user content is associated with the given station. After iteration and none of the VS per-user content is determined to be associated with the given station, the given station can process the PPDU normally or, as applicable, according to group level VS data.

At S16, in response to the given station ascertaining at S15 that the extracted VS per-user content is associated with the given station, the method 800 can include processing the PPDU in accordance with the VS information specific to the given station presented in the PPDU. For instance, the one or more processors of the given station can process the VS information included in the VS per-user content in accordance with the understood VS language. The one or more processors can then process the remainder of the PPDU in accordance with the VS per-user extensions.

Figure 9:
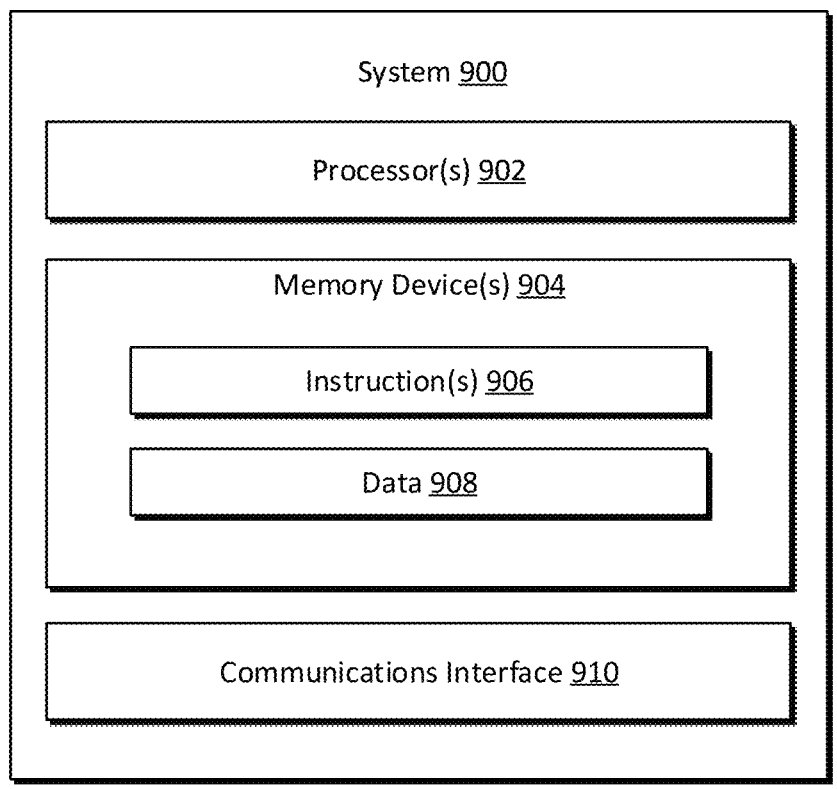
FIG. 9 is a schematic block diagram of a system according to one or more embodiments.

With reference now to FIG. 9, FIG. 9 is a schematic block diagram of a system 900 (e.g., a station or user) configured to generate and/or receive a PPDU containing VS per-user content. The system 900 can be an access point or a client, for example. As depicted, the system 900 includes one or more processors 902, one or more memory devices 904 (e.g., one or more non-transitory memory devices), and a communications interface 910 operable to transmit and/or receive transmissions, such as PPDUs. The one or more memory devices 904 can include instructions 906, such as computer-readable instructions, and data 908 that are stored thereon. When the instructions 906 are executed by the one or more processors 902, the one or more processors 902 can be caused to perform an operation, such as any of the operations disclosed herein, e.g., generating/receiving a PPDU containing VS per-user content.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

What is claimed is:

1. A method, comprising:
providing a physical layer protocol data unit (PPDU), the PPDU comprising:
a payload; and
a preamble, comprising:
one or more bits signaling that vendor-specific (VS) per-user content is present in the PPDU;
one or more bits signaling a VS language in which the VS per-user content is presented; and
VS bits representing the VS per-user content in the VS language, the VS per-user content is arranged in the PPDU to provide individualized VS information for respective users intended to receive the PPDU; and
transmitting the PPDU.

2. The method of claim 1, wherein the one or more bits signaling that the VS per-user content is present in the PPDU are included in a universal signal field (U-SIG).

3. The method of claim 1, wherein the one or more bits signaling that the VS per-user content is present in the PPDU and the one or more bits signaling the VS language in which the VS per-user content are included in a VS signal field (VS-SIG).

4. The method of claim 1, wherein the one or more bits signaling that the VS per-user content is present in the PPDU indicate a number of the VS bits assigned per user.

5. The method of claim 1, wherein the one or more bits signaling that the VS per-user content is present in the PPDU indicate a number of the VS bits assigned per user encoding block.

6. The method of claim 1, wherein the one or more bits signaling that the VS per-user content is present in the PPDU indicate a number of extra user fields or user encoding blocks per content channel in a signal field that contains the VS bits.

7. The method of claim 1, wherein the one or more bits signaling that the VS per-user content is present in the PPDU indicate a number of extra OFDM symbols in a signal field that contains the VS bits.

8. The method of claim 1, wherein the VS bits representing the VS per-user content in the VS language are included in respective user fields or user encoding blocks that are each dedicated to one or more of the users intended to receive the PPDU, and wherein the VS bits representing the VS per-user content in the VS language are added to existing bits of respective ones of the user fields or the user encoding blocks.

9. The method of claim 1, wherein the VS bits representing the VS per-user content in the VS language are included in extra user fields or extra user encoding blocks at an end of each content channel in a signal field, and wherein the VS per-user content is organized as a linearized version of a product of a number of users per content channel and a number of the VS bits per user or as a product of a number of users that understand the VS per-user content and a number of the VS bits per user.

10. The method of claim 9, wherein the VS per-user content is fragmented so that each fragment fits into available bits in respective ones of the extra user fields or the extra user encoding blocks.

11. The method of claim 1, wherein the VS bits representing the VS per-user content in the VS language are included after user encoding blocks of a signal field, and wherein the VS per-user content is organized as a linearized version of a product of a number of users per content channel and a number of the VS bits per user or as a product of a number of users that understand the VS per-user content and a number of the VS bits per user.

12. The method of claim 1, wherein the VS bits representing the VS per-user content in the VS language are included in a per-user VS signal field.

13. The method of claim 12, wherein the per-user VS signal field includes a plurality of user fields or a plurality of encoding blocks each dedicated to one or more of the users, and wherein each user field or user encoding block includes at least some of the VS bits representing the VS per-user content in the VS language.

14. The method of claim 12, wherein the VS bits representing the VS per-user content in the VS language are included in the per-user VS signal field, and wherein the VS per-user content is organized as a linearized version of a product of a number of users per content channel and a number of the VS bits per user or as a product of a number of users that understand the VS per-user content and a number of the VS bits per user.

15. The method of claim 12, wherein the one or more bits signaling that the VS per-user content is present in the PPDU indicate a modulation coding scheme associated with the VS per-user content.

16. The method of claim 1, wherein the VS per-user content indicates a change in meaning of at least one existing per-user field or at least one existing per-user bit in the PPDU.

17. The method of claim 1, wherein the preamble includes:
in a vendor-specific signal field (VS-SIG), one or more bits representing vendor-specific data, the vendor-specific data is represented in the VS language and provides instructions to a group of at least two users of the users intended to receive the PPDU.

18. The method of claim 1, wherein the individualized VS information for respective users intended to receive the PPDU includes individualized VS information for at least a first user and a second user, wherein the individualized VS information for the first user is different than the individualized VS information for the second user.

19. A non-transitory, computer readable medium comprising instructions that, when executed by one or more processors, cause the one or more processors to perform an operation, the operation comprising:
providing a physical layer protocol data unit (PPDU), the PPDU comprising:
a payload; and
a preamble, comprising:
one or more bits signaling that vendor-specific (VS) per-user content is present in the PPDU;
one or more bits signaling a VS language in which the VS per-user content is presented; and
VS bits representing the VS per-user content in the VS language, the VS per-user content is arranged in the PPDU to provide individualized VS information for respective users intended to receive the PPDU; and
causing transmission of the PPDU.

20. A station, comprising:
one or more processors; and
one or more memory devices storing a program executable by the one or more processors to perform an operation, the operation comprising:
  providing a physical layer protocol data unit (PPDU), the PPDU comprising:
    a payload; and
    a preamble, comprising:
      one or more bits signaling that vendor-specific (VS) per-user content is present in the PPDU;
      one or more bits signaling a VS language in which the VS per-user content is presented; and
      VS bits representing the VS per-user content in the VS language, the VS per-user content is arranged in the PPDU to provide individualized VS information for respective users intended to receive the PPDU; and
  causing transmission of the PPDU.

* * * * *

UNITED STATES PATENT AND TRADEMARK OFFICE
CERTIFICATE OF CORRECTION

PATENT NO. : 12,348,351 B2  
APPLICATION NO. : 18/540692  
DATED : July 1, 2025  
INVENTOR(S) : Brian D. Hart et al.

Page 1 of 1

It is certified that error appears in the above-identified patent and that said Letters Patent is hereby corrected as shown below:

In the Specification

Under Column no. 8, Line no. 45, Replace:
"A"
With:
--N--

Under Column no. 9, Line no. 8, Replace:
"A"
With:
--N--

Under Column no. 9, Line no. 9, Replace:
"Nis"
With:
--N is--

Under Column no. 10, Line no. 34, Replace:
"Nis"
With:
--N is--

Under Column no. 11, Line no. 43, Replace:
"A"
With:
--N--

Signed and Sealed this  
Twenty-third Day of September, 2025

John A. Squires  
*Director of the United States Patent and Trademark Office*